United States Patent [19]
Reich

[11] 3,933,145
[45] Jan. 20, 1976

[54] RECIRCULATING BARBEQUE DEVICE

[76] Inventor: Harry Reich, 2931 Fillmore, San Franciso, Calif. 94123

[22] Filed: Aug. 5, 1974

[21] Appl. No.: 494,846

[52] U.S. Cl. ............... 126/25 R; 99/476; 126/25 B; 126/79; 126/299 A
[51] Int. Cl.² .................. A47J 37/07; F24B 3/00
[58] Field of Search ............ 126/25, 79, 126/9 R, 9 B, 299 R, 299 A, 299 B; 99/474, 476; 110/49 R

[56] References Cited
UNITED STATES PATENTS

| 59,397 | 11/1866 | Hutson | 126/25 R |
|---|---|---|---|
| 1,713,817 | 5/1929 | Cotton | 110/49 R X |
| 2,850,991 | 9/1958 | Thompson | 126/299 A |
| 2,904,030 | 9/1959 | Quirk, Jr. | 126/25 R |
| 3,088,393 | 5/1963 | Huckabee | 126/25 A X |

*Primary Examiner*—William F. O'Dea
*Assistant Examiner*—Harold Joyce
*Attorney, Agent, or Firm*—Theodore J. Bielen, Jr.; Richard Esty Peterson

[57] ABSTRACT

A recirculating barbecue device which has a heat booster and smoke trap, the device includes a barbecue basin for holding coals, and a hood arranged above the basin for collecting gases and fly ash, the hood includes a filter for filtering the fly ash and an air fan and conduit for recycling collected gases and drawing additional air to the basin for increasing the temperature of coals in the basin and insuring a complete combustion of gases produced during burning of the coals.

4 Claims, 3 Drawing Figures

RECIRCULATING BARBEQUE DEVICE

BACKGROUND OF THE INVENTION

Barbecue grilling of meats and other foods is popular both in the home and in restaurants because of the unique flavors obtained by cooking over open coals. However, preparing coals is often tedious because of the time required to ignite the coals and raise their temperature to that proper for cooking. Present designs of barbecues often are such that an ideal broiling temperature is never achieved. Furthermore, the common conventional barbecue releases to the atmosphere noxious gases and particulate matter both during the ignition and cooking stages. This is particularly a problem in close areas, for example, patios where adjacent structures are dirtied from fly ash and oily smoke emitted during cooking. Additionally, where charcoals are used, there is usually a problem of spark release which constitutes a fire hazard, particularly in the environment conventional barbecues are used because of the often close proximity of structures. These and other problems have made the conventional barbecue less than satisfactory for an efficient and convenient charcoal grilling of meats and other foods.

SUMMARY OF THE INVENTION

This invention relates to a cooking device, in particular to a cooking hood having a heat booster and smoke trap that is used with a charcoal receptacle to trap particulate gases, resulting from cooking and the combustion of charcoals and the like. The recirculation of gases is also employed as an aspirator to supply a controlled quantity of preheated air to the coal receptacle for complete combustion of partially combusted gases, and for accelerating the ignition of the coals and raising the temperature of ignited coals, thereby maximizing the efficiency of cooking or grilling over open coals.

While it is preferred that the smoke trap and heat booster be constructed in combination with a coal receptacle for design compatibility, it is comtemplated that the smoke trap and heat booster may be adapted to conventional receptacles for accomplishing the above mentioned results.

The device in its preferred construction includes a charcoal receptacle and grill having a vent, preferably arranged below the coals, for example under a coal grate. However, in receptacles without a vent, recirculated gases can be directed over the top of coals with nearly equivalent results. Over the receptacle is a hood for collecting smoke and combustion gases rising from the burning coals or the cooking food. Connected to the hood is a flue or duct and a filter for eliminating fly ash and other particulate matter from the rising gases. The duct is attached to an electric fan or gas pump which creates a partial vacuum to pull gases and particulate matter through the duct and filter and to a conduit for delivery to a vent in the charcoal receptacle. The conduit is preferably a semi-rigid metal, flex hose which allows adjustments in the orientation of the conduit which remain fixed, thereby avoiding the variety of elbows and other fittings and supports normally required. However, a rigid conduit with support attachments may be used. The connection of the conduit at the vent is not air tight and in fact the conduit preferably directs the gases at a vent of substantially large diameter than the conduit such that an aspirator effect is achieved drawing air into the vent. The air is mixed with the gases and raised in temperature before fanning the coals. The fanned coals increase the rate of ignition of unignited coals and substantially raises their temperature. In this manner partially combusted gases such as carbon monoxide and other hydrocarbons are recycled for secondary combustion thereby reducing the amount of harmful pollutants eventually escaping to the atmosphere.

As noted, this device substantially reduces the start-up time of coals such that cooking can proceed shortly after initial ignition. Further, the resultant temperature of the coals is greatly elevated to the high temperature preferred for charcoal grilling.

The cooking hood may be adapted to conventional commercial or household barbecues or may be constructed in combination with a barbecue charcoal receptacle such as a basin type barbecue shown in the drawings.

DETAILED DESCRIPTION OF THE PREFERRED EMBODIMENTS

Figure 1:
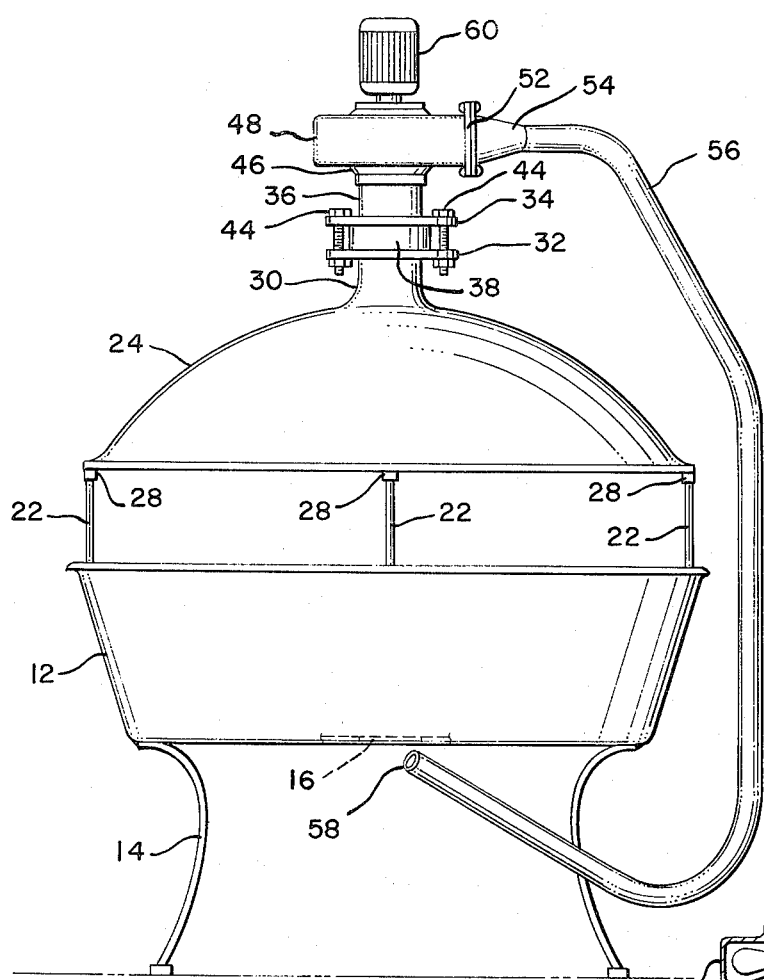
FIG. 1 is a front elevational view of a first embodiment of a recirculating barbecue device.

Referring to FIG. 1, the recirculating barbecue device designated generally by the reference numeral 10 is shown with a charcoal receptacle in the form of a basin 12. The basin 12 is supported by a stand 14 and includes a vent opening 16 at the bottom of the basin for entry of circulating air for burning coals in the basin.

Figure 2:
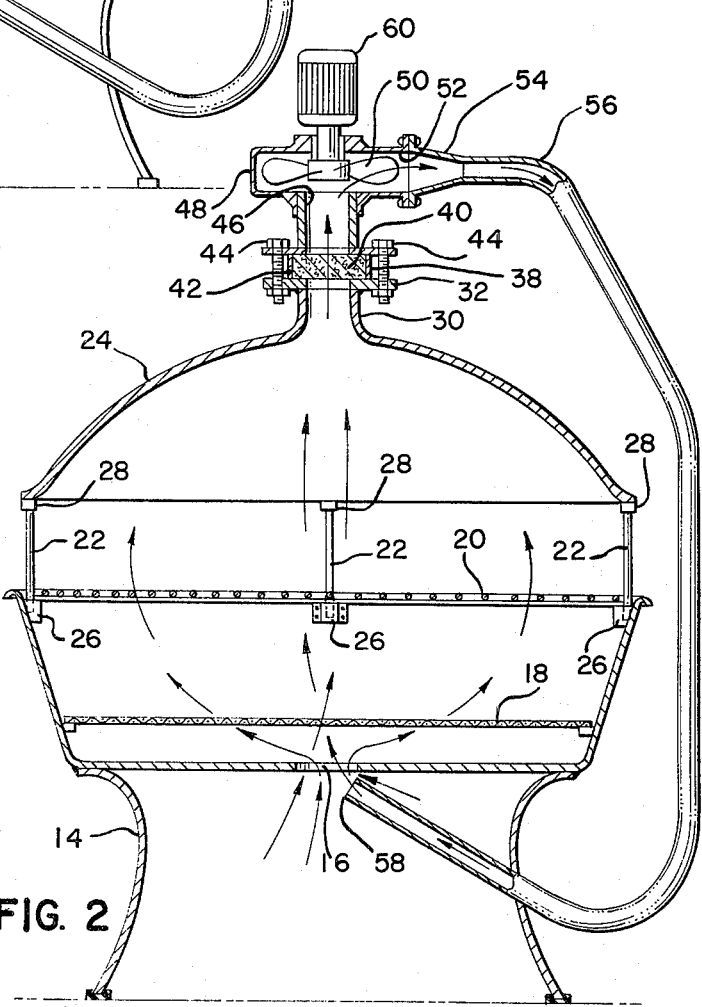
FIG. 2 is a cross sectional view of recirculating barbecue device of FIG. 1.

As shown in the sectional view in FIG. 2, the basin 12 includes a grate 18 displaced from the bottom of the basin for support of the coals. Because of a forced circulation in the recirculating barbecue device, the grate may be eliminated with nearly equivalent results. A grill 20 is arranged across the open top of the charcoal basin 12 for supporting meats or other foods for charcoal broiling. The grill may be replaced by a spit for fowl or other such roasting as is customary with barbecue devices.

Above the basin supported on four pins 22 is a hood 24. Each of the pins is set in a bracket 26 on the top edge of the basin and a opposite bracket 28 on the hood 24. For oven type broiling where maximum achievable temperatures are desired, the pins 22 are removed and the hood 24 is seated directly on the basin 12.

The hood 24 is contoured to form a short central flue or duct 30 having a flanged end 32. The flanged end 32 of the flue is connected to, but displaced from, a flanged end 34 of a duct 36. Between the two flanged ends 32 and 34 is arranged a filter 38, which includes a fibre glass wadding 40 in an impervious ring 42. The material may, of course, be varied and comprise steel or other metal fibres or any other substantially non-combustible material suitable for filtering particulate matter from the rising smoke of charcoal grilling. The filter is sandwiched between the flanged ends, 32 and 34, by bolts 44. The duct 36 is connected to an inlet 46 of a fan 48 having an impeller 50 which draws air and gases through the filter to an exhaust outlet 52 that is connected to an adaptor fitting 54 of a flexible conduit 56. The flexible conduit 56 is of the metal flex-conduit type commonly used for gas heater connectors which can be flexed to a fixed configuration by manual manipulation. In this manner supporting attachments for the conduit can be omitted.

The conduit 56 is arranged in a downwardly directed configuration such that the distal end 58 of the conduit is directed at the vent opening 16 at the bottom of the basin 12. An electric motor 60, preferably battery operated, drives the fan 48 to draw air and combustion gases through the filter 38, where particulate matter is removed. The filtered air and combustion gases are subsequently delivered to the vent opening 16. Since the end of the conduit does not have a sealed connection with the vent opening, the directed gases act as an aspirator drawing and mixing additional fresh air into the bottom of the basin. The gas flow cycle is schematically illustrated by the flow arrows in FIG. 2. The aspirated mixture fans coals in the basin to achieve a reduced ignition time and an increased resultant temperature for efficient charcoal cooking.

Figure 3:
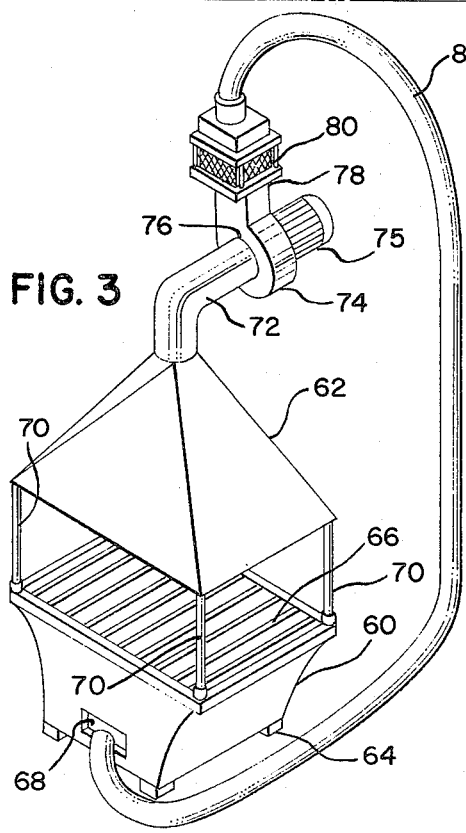
FIG. 3 is a perspective view of a second embodiment of a recirculating barbecue device.

An alternate embodiment of the invention is shown in FIG. 3, in which a conventional hibachi 60 has an adapted hood 62 for transforming the hibachi to a recirculating barbecue device with the smoke trapping and heat boosting features of the device shown in FIGS. 1 and 2. The hibachi 60 is supported on wooden feet 64 and has a grill 66 for supporting foods over open coals contained in the hibachi. The hibachi has a side vent 68 for providing ventilation for burning coals. The hood 62 is supported above the grill on four supports 70 adapted to the corners of the hibachi 60. The supports 70 are removable for direct placement of the hood on the grill 60 for oven type, high temperature broiling. The hood 62 is pyramidal and has a flue 72 at the apex through which smoke and combustion gases are drawn by a reel fan 74 driven by a motor 75. In this alternate arrangement, the fan 74 is connected at its inlet 76 to the flue 72 and at its outlet 78 to a filter 80 of the same general type as described above. The filter 80 is joined to a flexible conduit 82 which is routed to direct air and filtered gases of combustion to the side vent 68. Again the conduit 82 does not have a sealed connection with the vent 68, but is arranged to function as an aspirator drawing additional fresh air over the coals.

The recirculating barbecue device can be adapted to commercial barbecues of substantially larger size by proper adjustment of the size and configuration of the hood and recirculating components.

While in the foregoing specification, embodiments of the invention have been set forth in considerable detail for purposes of making a complete disclosure thereof, it will be apparent to those skilled in the art that numerous changes may be made in such details without departing from the spirit and principles of the invention.

What is claimed is:

1. A cooking device for use with a charcoal-type open receptacle having a charcoal burning area comprising: a hood having means for supporting said hood over the open receptacle; a flue connected to said hood with an opening for collecting smoke and gases from combustion of charcoals in said receptacle; filter means connected to said flue for filtering particulate matter from the smoke and gases of combustion, said filter means including fan means for conveying smoke and gases through the filter means; a conduit having a first end and a second end, said conduit having further first means for connecting the first end of the conduit to the filter means, and second means for directing the second end of said conduit at the charcoal burning area of said receptacle; and, an air admission vent in said receptacle proximate to said charcoal burning area, wherein said second end of said conduit is directed at said air admission vent from outside said receptacle, the end of said conduit being proximately arranged with said air admission vent and adapted to aspirate air into said vent by action of said smoke and gases conveyed into said receptacle from said conduit.

2. A cooking device for charcoal-type cooking comprising: an open receptacle having a charcoal burning area; a hood having means for supporting the hood over the open receptacle; a duct connected to said hood with an opening for collecting smoke and gases from combustion of charcoal from said receptacle; filter means for filtering particulate matter from the smoke and gases of combustion, said filter means including fan means for conveying smoke and gases through the filter means; a conduit having a first end and a second end, said conduit having further first means for connecting the first end of the conduit to the filter means, and second means for directing the second end of said conduit at the charcoal burning area of said receptacle; and, an air admission vent in said receptacle proximate to said charcoal burning area, wherein said second end of said conduit is directed at said air admission vent from outside said receptacle, the end of said conduit being proximately arranged with said air admission vent and adapted to aspirate air into said vent by action of said smoke and gases conveyed into said receptacle from said conduit.

3. The cooking device of claim 2 wherein said air admission vent is below said charcoal burning area.

4. The cooking device of claim 2 wherein said second means for directing the second end of said conduit at the charcoal burning area comprises a metal flex-hose.

* * * * *